United States Patent

[11] 3,560,013

[72] Inventor Lawrence J. Lee
 1410 Ames Ave., Saint Paul, Minn. 55106
[21] Appl. No. 820,063
[22] Filed Apr. 29, 1969
[45] Patented Feb. 2, 1971

[54] SNOWMOBILE-TOBOGGAN HITCH KIT
 6 Claims, 9 Drawing Figs.
[52] U.S. Cl. .................................................. 280/19, 280/24
[51] Int. Cl. .................................................. B62b 13/00
[50] Field of Search .......................................... 280/18, 24, 19, 12; 297/192, 193, 195

[56] References Cited
 UNITED STATES PATENTS
 351,790 11/1886 Paton ........................... 280/18
 2,468,470 4/1949 Spieth ........................... 280/24
 2,855,059 10/1958 Sutherland ..................... 180/5
 3,485,312 12/1969 Swenson et al. ................ 180/5
 212,940 12/1968 Erickson ........................ 14/24

Primary Examiner—Leo Friaglia
Assistant Examiner—Robert R. Song
Attorney—Robert M. Dunning ABSTRACT: This invention relates to a toboggan kit used to provide a means of attaching a toboggan to a snowmobile. The kit includes reinforcing plates which extend inside and outside the curved front end of the toboggan and are bolted together. A hitch is hingedly connected to the reinforcing plates by a transverse horizontal axis and extends forwardly for attachment with the snowmobile. Preferably a seat is mounted along the longitudinal center of the toboggan to be straddled by the occupants. A windshield is also preferably provided at the front end of the seat.

PATENTED FEB 2 1971

3,560,013

INVENTOR
LAWRENCE J. LEE

ATTORNEY

INVENTOR
LAWRENCE J. LEE
ATTORNEY

SNOWMOBILE-TOBOGGAN HITCH KIT

This invention relates to an improvement in snowmobile toboggan hitch kit and deals particularly with a kit which may be used in conjunction with a toboggan to permit a toboggan to be towed behind a snowmobile.

The use of snowmobiles has increased many times during recent years. One of the difficulties experienced with vehicles of this type lies in the fact that the sport can be enjoyed by but one or two persons at a time. In a family with several children, it is necessary for the members of the family to take turns in riding on the vehicle which usually accommodates only one or two persons. Under ordinary conditions, snowmobiles may only be used on frozen lakes and in the country due to the fact that they are not licensed for use on the highways. When a family goes out for an afternoon of sport, the major portion of the family must sit in a car or other shelter while one or two members of the family are using the snowmobiles. It has been found that many of the families who purchase snowmobiles also own toboggans. With this in mind, I have developed a kit which may be used to connect a toboggan to a snowmobile so that several additional persons may enjoy a ride simultaneously. Toboggans are usually capable of accommodating several persons, and by attaching the toboggan to the rear of the snowmobile, oftentimes an entire family can enjoy a snowmobile trip simultaneously.

Toboggans were originally designed for sliding down a slope, and accordingly it is often sometimes difficult to maintain an upright position when sitting upon a toboggan traveling along a horizontal path. Accordingly, a feature of the present invention resides in the provision of an elongated boxlike member which may be mounted upon the toboggan and which is padded on its upper surface to form a seat for a number of persons. The support is narrow relative to the width of the toboggan so that the occupants may straddle the support and place their feet on opposite sides of the toboggan, thereby producing a stable comfortable seat for the occupants.

A further feature of the present invention resides in the provision of a structure of the type described in which the support may comprise a boxlike element designed to contain portions of the equipment or supplies.

A further feature of the present invention resides in the provision of a toboggan hitch which is provided with a supporting plate secured forwardly of the curved forward edge of the toboggan, and a complimentary reinforcing plate which lies inwardly of the curved end of the toboggan. Holes are provided through the curved end of the toboggan so that the two plates may be clamped together, forming a firm connection with the toboggan without weakening the structure thereof.

A further feature of the present invention resides in the provision of a device of the type described including a windshield which is detachably secured to the toboggan forwardly of the seat mounted thereupon. This windshield is preferably formed of a transparent plastic or similar material which will provide a wire through the windshield but which will prevent snow and ice thrown rearwardly from the track of the snowmobile from striking the riders of the toboggan.

A further feature of the present invention resides in the provision of a shield plate secured to the hitch connecting the toboggan to the snowmobile which also acts as a deflector for snow and ice thrown rearwardly by the tracks of the snowmobile upon its movement.

A further feature of the present invention resides in the provision of a device of the type described which can be easily and quickly attached or detached. The windshield is attached to the forward end of the toboggan seat by four bolts so that by removing the wing nut on these bolts, the windshield may be detached and carried separately. The seat is attached to the toboggan by a series of perhaps four bolts so that if desired, the seat may be removed when the toboggan is to be used in a normal manner. The hitch is connected to the toboggan by means of two bolts so that by removing the two wing nuts on these bolts, the hitch may be detached from the toboggan. The hitch may similarly be detached from the snowmobile by the removal of one or two bolts, so that the entire apparatus may be disassembled when not in use, and the snowmobile as well as the toboggan may be used in a normal manner when desired.

A further feature of the present invention lies in the fact that the toboggan seat is provided with lines extending longitudinally thereof and on either side thereof which may be grasped by the occupants as the toboggan is drawn over the snow. Thus the occupants of the toboggan may hold themselves firmly in place during their travel over the snow.

These and other objects and novel features of the present invention will be more clearly and fully set forth in the following specification and claims.

In the drawings forming a part of the specification.

Figure 5:
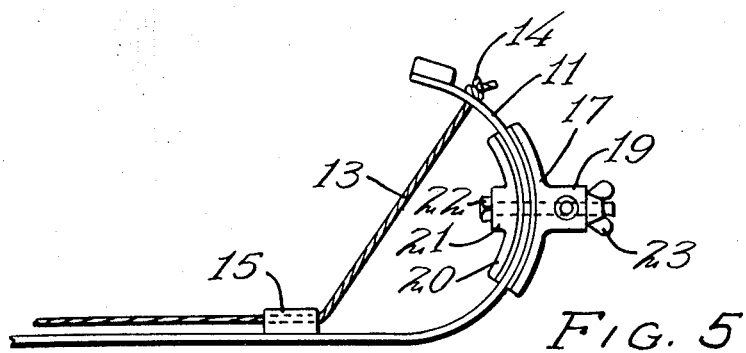
FIG. 5 is a side elevational view of the forward end of the toboggan illustrating the manner in which the hitch is attached thereto.

The toboggan A is of conventional form such as is in common use today. The toboggan usually includes a series of side by side boards which form the floor 10, and which are curved at their forward ends as indicated at 11 through substantially a semicircle. The floor 10 is reinforced by a series of transversely extending cleats 12 which connect the boards and hold them in proper relation. In normal use, the floor is covered by a toboggan pad which prevents the occupants from direct contact with the transversely extending cleats. A pair of a cables or ropes 13 are secured at their forward ends, as indicated in FIG. 5, with a knot or other obstruction 14, the cords extending through the upper portion of the reversely curved forward end 11 of the toboggan, and extending through a series of longitudinally spaced guides 15 on opposite sides of the toboggan. The ropes are knotted at their rear ends as indicated at 16 to hold the ropes in place. The guides 15 support the ropes 13 spaced above the floor 10 of the toboggan so that the ropes may be grasped by the hands of the occupants when the toboggan is used in its conventional manner.

The kit which I provide includes a reinforcing plate 17 which is curved to fit the outer contour of the curved forward end 11 of the toboggan, this contour being substantially standard. The vertical center portion of the curved plate 17 is provided with a forwardly extending rib 19 which extends traversely across the plate 17. A cooperable reinforcing plate 20 is provided to fit the inner contour of the curved forward portion 11 of the toboggan, the convex of the curved plate 20 being parallel to the convex side of the forward reinforcing plate 17. A central rib 21 extends transversely across the plate 20.

A pair of laterally spaced bolts 22 extend through the rib 21 of the inner plate 20, through the curved forward end 11 of the toboggan, and through the forwardly projecting rib 19 of the outer reinforcing plate 17. The two places are clamped together by means of wing nuts such as 23 on the bolts 22. One of the few modifications of the toboggan which is necessary is to drill holes through the curved end 11 of the toboggan to accommodate the bolts 22.

Figure 1:
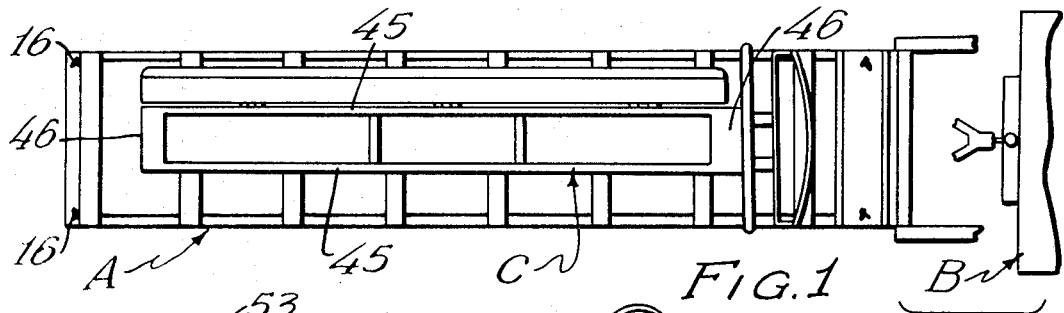
FIG. 1 is a top plan view of the toboggan showing a portion of the hitch connected thereto.
Figure 2:
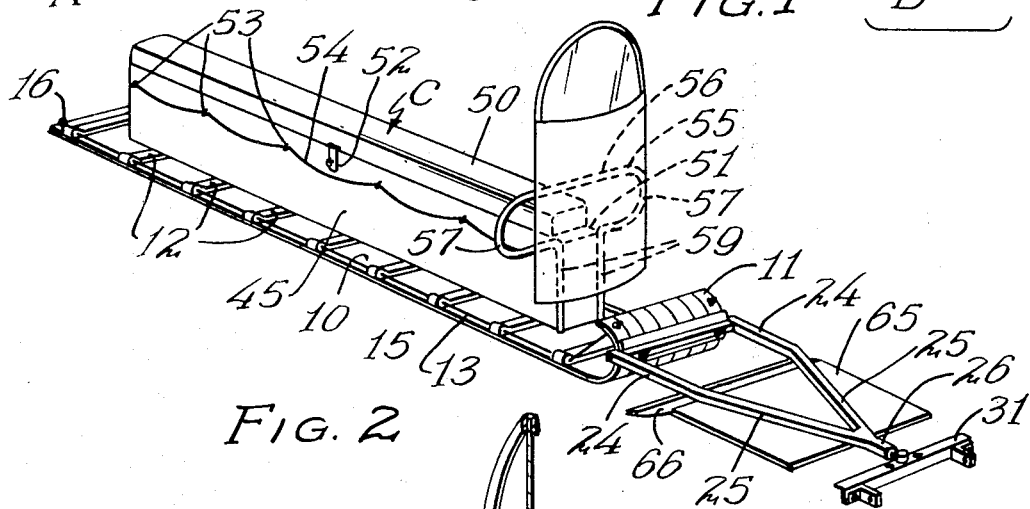
FIG. 2 is a perspective view of the toboggan and hitch shown ready for attachment to the snowmobile.
Figure 8:
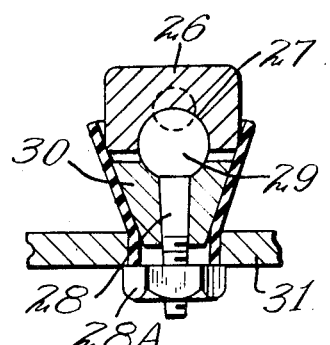
FIG. 8 is a vertical sectional view through a portion of the hitch, the position of the section being indicated by the line 8—8 of FIG. 7.

The hitch which is designed to connect the toboggan to the snowmobile is best illustrated in FIG. 2 of the drawings. As indicated in this FIG., the hitch is in the form of a yoke including a pair of square tubular parallel portions 24, the forward ends of which are connected to inwardly converging portions 25 of similar square tubular section, which join together to form a common shank 26. The forward end of the shank 26 is shown in FIG. 8 as being provided with a socket 27 designed to accommodate a ball 29. The ball 29 is engaged between the shank 26 and a tapered sleeve 30 which is engaged between the ball head 29 of the bolt 28 and the angle member 31 which is designed for attachment to the snowmobile, the mobile unit being indicated generally by the letter B. The bolt 28 is secured to the angle member 31 by a nut 28 A.

Figure 6:
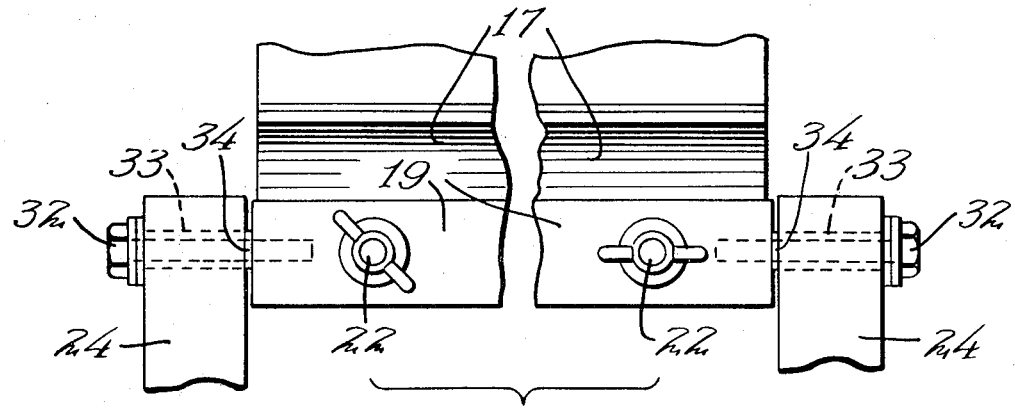
FIG. 6 illustrates the manner in which the hitch is connected to the forward end of the toboggan.
Figure 7:
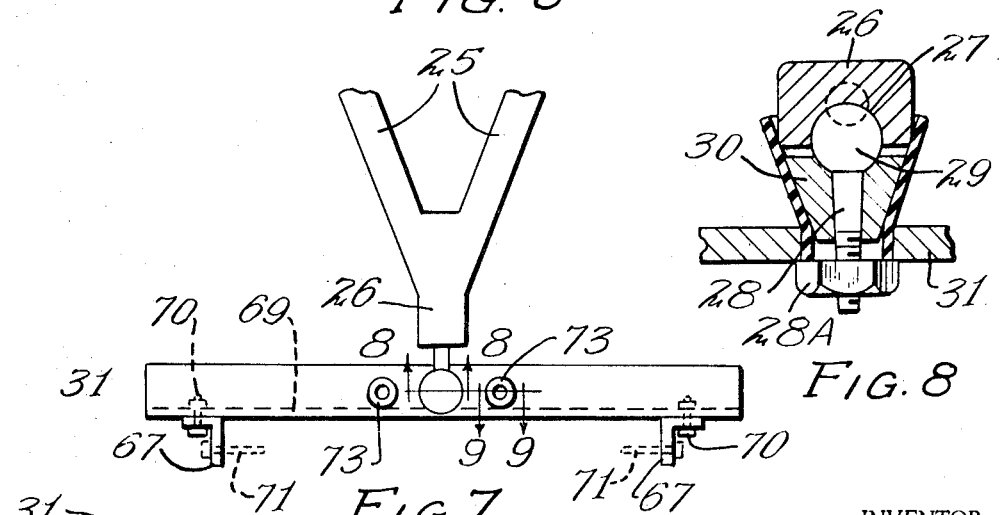
FIG. 7 is a plan view of the forward end of the hitch showing the manner in which the hitch is connected to an angle designed for attachment to the snowmobile.

Bolts 32 extend in alignment from opposite ends of the tubular parallel portions 24 of the hitch and into the opposite ends of the forwardly extending rib 19 as indicated in FIG. 6 of the drawings. The bolts 32 extend through suitable bearings 33 in the hitch sides 24, and the hitch is held in spaced relation by washers 34 or inward extensions of the bearings 33. Thus the hitch including the hitch sides 24 may be swung about a horizontal axis in a vertical plane.

Figure 4:
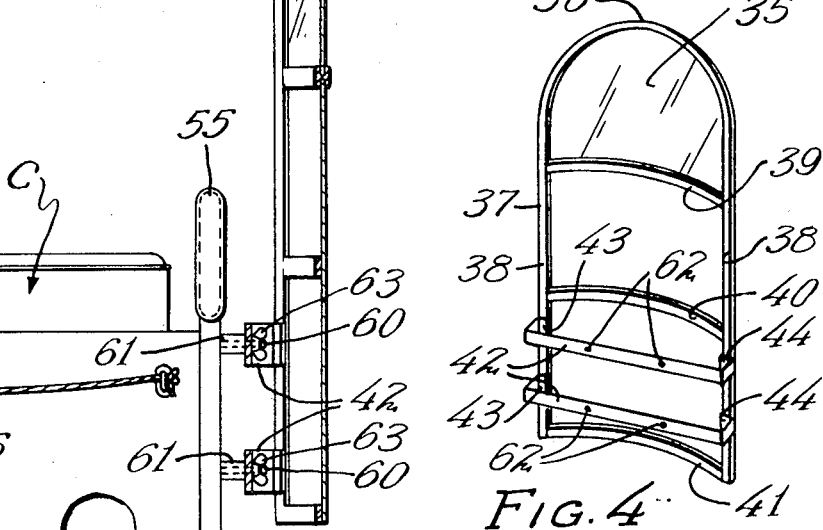
FIG. 4 is a rear perspective view of the windshield detached from the toboggan seat.
Figure 3:
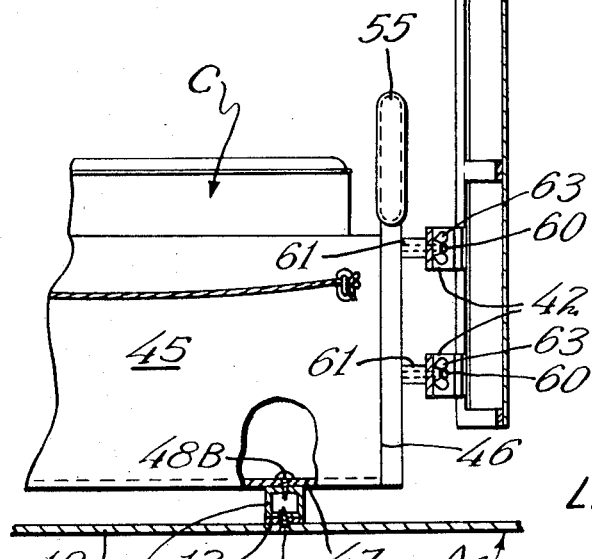
FIG. 3 is a side elevational view of the forward end of the toboggan seat showing the manner in which the windshield is attached thereto.
Figure 9:
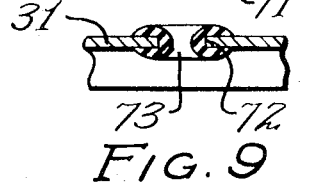
FIG. 9 is an enlarged sectional view through a portion of the hitch, the position of this section being indicated by the line 9—9 of FIG. 7.

The windshield is constructed as best illustrated in FIG. 9 of the drawings. Obviously, the shape of the windshield may be varied in design. In the particular arrangement illustrated, the windshield comprises a concavo-convex sheet of flexible material indicated at 35 having a rounded upper edge 36. A reinforcing frame 37 extends about the periphery of the windshield, and a pair of transverse braces 39 and 40 extend across the windshield, spaced above the bottom concave frame member 41. A pair of generally U-shaped brackets 42 extend between the frame sides 38 of the frame 37. The U-shaped brackets 42 are provided with substantially aligned attachment ears 43 attached to one frame side 38 and a similar pair of transverse ears 44 attached to the other frame side 38. FIG. 4 shows the windshield as it would appear detached from the remainder of the construction. As is indicated in FIG. 3 of the drawings, the brackets 42 are attached to the forward end of the seat member C in a manner which will be later described in detail.

As will be understood, the floor portion 10 of the toboggan rests upon the snow, and accordingly the occupants of the toboggan are very close to the surface of the snow during the use of the toboggan. When the toboggan is used as a trailer, as in the present case, the riders of the toboggan might be injured in the event that they reach out laterally and touch the snow, as this might lead to their being pulled from the toboggan. Accordingly, where the toboggan is to be used by younger persons, it is preferable to include in my kit a seat which will protect the passengers from injury.

The seat structure C includes parallel longitudinally extending sides 45, and parallel ends 46. The seat C is provided with a bottom wall 47 which is bolted to the toboggan A, preferably through a transverse strut 12. Square tubular crossmembers 48 overlie a pair of cleats 12 and are secured thereto by self-trapping screws 48A which extend upwardly through the floor 10 and cleat 12 and into the members 48. Similar self-tapping screws 48B extend downwardly through the bottom wall 47 and into the crossmembers 48. The seat frame including the members 45 and 46 are covered by a top portion 50 which is padded, and which forms a seat for the occupants of the toboggan. The entire seat C is sufficiently narrow to be straddled by the occupants of the toboggan, and to permit room for resting the feet of the occupants on the toboggan on opposite sides of the seat.

The top 50 is preferably hinged along an edge 51 by hinges not illustrated in the drawings, and the seat is usually held in closed position by a suitable hasp 52. The interior of the seat support forms a receptacle which may be used to accommodate various equipment or supplies to be used in conjunction with the use of the toboggan.

The opposite sides 45 of the seat are provided with suitable rope guides such as 53 to support ropes 54 which are anchored at opposite ends. These ropes or cables 54 may be grasped by the occupants of the toboggan to maintain proper balance.

The handlebar structure 55 is secured to the forward end of the seat support to provide a bracing means for the foremost occupant of the seat C. The handlebar structure comprises a loop having a horizontal upper side 56, and rounded ends 57 which connect with a pair of vertical shanks 59 which are secured to the forward end 46 of the boxlike seat support.

As indicated in FIG. 3, the brackets 42 are attached to the forward side 46 of the seat support by means of bolts 60 which extend forwardly through spacing sleeves 61 and extend through suitable apertures 62 in the brackets 42. Wing nuts 63 are provided to anchor the windshield in place.

From the foregoing description it may be seen that by attaching my kit to a toboggan of conventional type, a trailer may be provided attached to the rear of a snowmobile or similar vehicle so that the number of persons accommodated on a snowmobile ride may be greatly increased. The windshield prevents the occupants of the toboggan from being struck by materials thrown rearwardly from the rear portions of the tracks of the snowmobile. Furthermore, a seat is provided on the toboggan which prevents the occupants from being closely adjacent to the snow as they are drawn along the snow, thereby greatly increasing the safety of the apparatus. In addition, a baffle plate 65 having a flexible rear edge 66 is secured to the under surface of the frame of the hitch, thereby assisting in deflecting snow and similar materials which might otherwise be thrown rearwardly by the tracks of the snowmobile against the occupants of the toboggan. A pair of angle brackets 67 are secured to the vertical flange 69 of the angle member 31 by bolts 70 or other suitable means. These brackets 67 are apertured to accommodate aligned bolts 71 used to fasten the angle member 31 to the snowmobile. Alternatively, the angle member 31, may be provided with apertures 72 protected by grommets 73. These grommets may accommodate a tow line for securing the angle member to the snowmobile.

I claim:
1. A snowmobile trailer including:
   a toboggan having an elongated body portion and an upwardly curved front end, said body portion being of a length sufficient to comfortably accommodate a plurality of persons in a sitting position in tandem arrangement:
   an elongated rectangular seat structure mounted upon said body portion and extending the major portion of the length thereof;
   said seat structure including spaced sides connected by front and rear end members, said sides and end members extending upwardly from said body portion;
   said sides being spaced apart a distance substantially less than the width of said body portion;
   said seat structure being centered between the sides of said body portion and spaced therefrom to provide foot rests on said body portion on opposite sides of said seat structure; and
   a seat top supported by said sides and end members and including a passenger supporting cushion.

2. The structure of claim 1 and including a handlebar structure secured to said front end member and extending upwardly therefrom.

3. The structure of claim 2 and in which said handlebar comprises a loop having a horizontal upper side terminating in rounded ends connected to a pair of vertical shanks secured to said front member.

4. The structure of claim 1 and including a windshield substantially equal in width to said toboggan secured to said front member to extend upwardly therefrom.

5. The structure of claim 2 and including a windshield secured to said front member forwardly of said handlebar structure and extending upwardly therefrom.

6. The structure of claim 1 and in which said seat top is hingedly cone connected to the remainder of said seat structure.